US011597015B2

(12) United States Patent  
Clark et al.

(10) Patent No.: US 11,597,015 B2  
(45) Date of Patent: Mar. 7, 2023

(54) METHOD OF MANUFACTURING A PLANET CARRIER OF A GEARBOX

(71) Applicant: ROLLS-ROYCE plc, London (GB)

(72) Inventors: Daniel Clark, Derby (GB); Andrew R Ramshaw, Derby (GB)

(73) Assignee: ROLLS-ROYCE PLC, London (GB)

(*) Notice: Subject to any disclaimer, the term of this patent is extended or adjusted under 35 U.S.C. 154(b) by 586 days.

(21) Appl. No.: 16/695,727

(22) Filed: Nov. 26, 2019

(65) Prior Publication Data

US 2020/0171577 A1   Jun. 4, 2020

(30) Foreign Application Priority Data

Dec. 4, 2018 (GB) ...................................... 1819768

(51) Int. Cl.  
*B22F 7/06* (2006.01)  
*F16H 57/08* (2006.01)  
(Continued)

(52) U.S. Cl.  
CPC .............. *B22F 7/062* (2013.01); *B23P 15/00* (2013.01); *F16H 57/0431* (2013.01);  
(Continued)

(58) Field of Classification Search  
CPC .......... B22F 7/602; B23P 15/00; B23P 15/14; B23P 15/006; B33Y 80/00; B33Y 10/00;  
(Continued)

(56) References Cited

U.S. PATENT DOCUMENTS 4,569,195 A    2/1986  Johnson  
5,292,292 A *  3/1994  Heinrich ............... F16H 57/082  
                                              475/346  
(Continued)

FOREIGN PATENT DOCUMENTS

DE     102011004192 A1 *  8/2012  ............. B21D 53/00  
DE     102015222611 A1 *  6/2016  ............. B21D 53/28  
(Continued)

OTHER PUBLICATIONS

English Translation of DE-102016203157-A1 (Year: 2016).*  
(Continued)

*Primary Examiner* — Jason L Vaughan  
(74) *Attorney, Agent, or Firm* — Oliff PLC

(57) ABSTRACT

A method of manufacturing a planet carrier of a gearbox comprises manufacturing a plurality of preforms. Each preform comprises a base portion, a first end portion connected to a first end of the base portion, a second end portion connected to a second end of the base portion, a first side portion connected to a first side of the base portion, a second side portion connected to a second side of the base portion and a top portion. The first and second end portions and the first and second side portions are folded relative to the base portion and the top portion is folded and the adjacent edges of the portions of each preform are secured together to form a support structure. A first ring and a second ring are manufactured. The first and second end portions of each support structure are secured to the first and second rings respectively.

20 Claims, 10 Drawing Sheets

(51) Int. Cl.
*F16H 57/04* (2010.01)
*B23P 15/00* (2006.01)
*B33Y 10/00* (2015.01)
*B33Y 80/00* (2015.01)
*F02C 7/36* (2006.01)

(52) U.S. Cl.
CPC ....... *F16H 57/0479* (2013.01); *F16H 57/082* (2013.01); *B33Y 10/00* (2014.12); *B33Y 80/00* (2014.12); *F02C 7/36* (2013.01)

(58) Field of Classification Search
CPC ......... Y10T 29/49462; Y10T 29/49467; F16H 57/0431; F16H 57/0479; F16H 57/082; F02C 7/36; F05D 2260/40311; F05D 2260/98
See application file for complete search history.

(56) References Cited

U.S. PATENT DOCUMENTS

| | | | |
|---|---|---|---|
| 5,937,633 A | | 8/1999 | Wang |
| 7,100,416 B2 * | | 9/2006 | Suzumura ............. F16H 57/082 29/894.362 |
| 8,900,089 B2 * | | 12/2014 | Mizuno ................ F16H 57/082 475/331 |
| 10,378,643 B2 * | | 8/2019 | Cintula ................... B23P 15/14 |
| 2004/0082432 A1 * | | 4/2004 | Suzumura ............. F16H 57/082 475/331 |
| 2013/0102432 A1 | | 4/2013 | Imai et al. |
| 2021/0123418 A1 * | | 4/2021 | Wertz ....................... C23C 4/12 |

FOREIGN PATENT DOCUMENTS

| | | | | |
|---|---|---|---|---|
| DE | 102015213723 A1 * | 1/2017 | ............. | F16H 57/08 |
| DE | 102015213723 A1 | 1/2017 | | |
| DE | 10 2015 214110 A1 | 2/2017 | | |
| DE | 102015214110 A1 * | 2/2017 | ............. | F16H 57/08 |
| DE | 102016203157 A1 * | 8/2017 | ............. | F16H 57/08 |
| DE | 102016203157 A1 | 8/2017 | | |
| DE | 10 2016 219949 A1 | 4/2018 | | |
| DE | 102016219949 A1 * | 4/2018 | | |
| DE | 102017112340 A1 * | 12/2018 | ............. | F16H 57/08 |
| DE | 102017117954 A1 * | 2/2019 | | |
| EP | 1 371 879 A2 | 12/2003 | | |
| EP | 2489903 A1 * | 8/2012 | ............. | B21D 53/00 |
| EP | 3 002 434 A1 | 4/2016 | | |
| EP | 3663022 A1 * | 6/2020 | ............. | B22F 7/062 |
| JP | H07133848 A | 5/1995 | | |
| JP | 2005299891 A * | 10/2005 | ........... | F16H 57/082 |
| WO | WO-2019202047 A1 * | 10/2019 | ........... | B21D 39/032 |

OTHER PUBLICATIONS

English Translation of DE-10201619949-A1 (Year: 2016).*
Search Report of the Intellectual Property Office of the United Kingdom for GB1819768.1 with search date of May 23, 2019.
May 7, 2020 Extended Search Report issued in European Patent Application No. 19206811.2.
Apr. 2, 2021 Office Action issued in U.S. Appl. No. 16/694,134.
Jul. 9, 2021 Office Action issued in U.S. Appl. No. 16/694,134.

* cited by examiner

METHOD OF MANUFACTURING A PLANET CARRIER OF A GEARBOX

CROSS-REFERENCE TO RELATED APPLICATIONS

This specification is based upon and claims the benefit of priority from UK Patent Application Number GB1819768.1 filed on 4 Dec. 2018, the entire contents of which are incorporated herein by reference.

BACKGROUND OF THE DISCLOSURE

The present disclosure relates to a method of manufacturing a planet carrier for a gearbox and in particular for a planet carrier for a gearbox for a geared gas turbine engine, e.g. a geared turbofan gas turbine engine.

In the pursuit of ever-more efficient air travel, some new designs of gas turbine engine are incorporating gearboxes to enable further optimisation of the engine's operating parameters. Whilst the inclusion of one or more gearboxes in the engine allows the various turbines and compressors to operate closer to their optimal speeds, it does also add mass to the engine, which is usually to be avoided if possible. To complicate the issue further, such gearboxes must be made to withstand enormous forces acting upon them during operation. To that end, it is known to construct gearbox components using single-piece high-strength steel forging, but such techniques require large, complex and expensive equipment, and such components are difficult to machine in such a way as to minimise their mass. It is therefore desirable to provide a method for constructing gearbox components for a gas turbine engine which allows the use of stronger, more lightweight materials in the component construction. It is also desirable to provide a method for manufacturing gearbox components which are as light as possible, whilst still having the required structural integrity to withstand the forces that act upon them during operation.

BRIEF SUMMARY OF THE DISCLOSURE

According to a first aspect there is provided a method of manufacturing a planet carrier of a gearbox, the method comprising the steps of:
a) manufacturing a plurality of preforms, each preform comprising a base portion, a first end portion located at and connected to a first end of the base portion, a second end portion located at and connected to a second end of the base portion, a first side portion located at and connected to a first side of the base portion, a second side portion located at and connected to a second side of the base portion and a top portion,
b) folding the first end portion, the second end portion, the first side portion, the second side portion relative to the base portion and folding the top portion and securing the adjacent edges of the first end portion, the second end portion, the first side portion, the second side portion and the top portion of each preform together to form a box support structure,
c) manufacturing a first ring and a second ring, and
d) securing the first end portion of each box support structure to the first ring and securing the second end portion of each box support structure to the second ring.

The preform may be a planar preform in which the base portion, the first end portion, the second end portion, the first side portion, the second side portion and the top portion are arranged in a plane The top portion may be connected to the first side portion.

Step a) may comprise forming at least one aperture through the first end portion and forming at least one aperture through the second end portion.

Step a) may comprise manufacturing the preforms by additive layer manufacturing to from a plurality of preforms comprising fused/sintered powdered material. Step a) may comprise manufacturing each of the preforms by powder bed deposition. Step a) may comprise manufacturing all of the preforms by powder bed deposition, including manufacturing the preforms sequentially one above the other in the powder bed deposition apparatus. Step a) may comprise adjusting the additive layer manufacturing process to produce bendable connections between the first end portion and the base portion, the second end portion and the base portion, the first side portion and the base portion and the second side portion and the base portion. Step a) may comprise adjusting the additive layer manufacturing process to produce reduced density of the fused/sintered powder material at the bendable connections, slots in the bendable connections, thinner material at the bendable connections or reduced density of the fused/sintered powder material and thinner material at the bendable connections.

Step a) may comprise additive layer manufacturing interlocking features on the adjacent edges of the first end portion, the second end portion, the first side portion, the second side portion and the top portion of each preform. Step b) may comprise securing the adjacent edges of the first end portion, the second end portion, the first side portion, the second side portion and the top portion of each preform using the interlocking features. The interlocking features may be dovetail projections and dovetail slots. The interlocking features may be tenon projections and mortise slots.

Step a) may comprise forming an aperture through the base portion. Step a) may comprise forming an aperture through the first side portion. Step a) may comprise additive layer manufacturing at least one structure projecting from the base portion and extending across the base portion between the first end portion and the second end portion, the at least one structure having a passage extending therethrough between the first end portion and the second end portion. Step a) may comprise additive layer manufacturing a wall on the first side portion and additive layer manufacturing a wall on the first side portion.

Step a) may comprise manufacturing the preforms by cutting the preforms from sheet material. Step a) may comprise laser cutting the preforms from sheet material. Step b) may comprise bending the sheet material of each of the preforms.

Step a) may comprise cutting interlocking features on the adjacent edges of the first end portion, the second end portion, the first side portion, the second side portion and the top portion of each preform. Step b) may comprise securing the adjacent edges of the first end portion, the second end portion, the first side portion, the second side portion and the top portion of each preform using the interlocking features. The interlocking features may be dovetail projections and dovetail slots.

Step b) may comprises welding, brazing or bonding the adjacent edges of the first end portion, the second end portion, the first side portion, the second side portion and the top portion of each preform together to form the box support structure. Step d) may comprise welding, brazing or bonding the first end portion of each box support structure to the first ring and welding, brazing or bonding the second end portion of each box support structure to the second ring.

Step d) may comprise fastening each box support structure to the first ring and to the second ring. Step d) may comprise fastening each box support structure to the first ring and the second ring using at least one bolt and at least one nut.

Step c) may comprise forming a plurality of circumferentially spaced recesses in the first ring and a plurality of circumferentially spaced recesses in the second ring and step d) comprises locating the first end portion of each box support structure in a corresponding one of the plurality of circumferentially spaced recesses in the first ring and locating the second end portion of each box support structure in a corresponding one of the plurality of circumferentially spaced recesses in the second ring.

Step c) may comprise manufacturing a first metal ring or a first metal matrix ring. Step c) may comprise manufacturing a second metal ring or a second metal matrix ring. Step c) may comprise casting or forging the first metal ring. Step c) may comprise casting or forging the second metal ring. Step c) may comprise casting the first metal matrix ring. Step c) may comprise casting the second metal matrix ring. The first ring may comprise steel, titanium, a titanium alloy, nickel, nickel alloy, cobalt, a cobalt alloy, aluminium or aluminium alloy. The second ring may comprise steel, titanium, a titanium alloy, nickel, nickel alloy, cobalt, a cobalt alloy, aluminium or aluminium alloy. The first metal matrix ring may comprise an aluminium metal matrix composite. The second metal matrix ring may comprise an aluminium metal matrix composite.

The sheet material may comprise a metal. The sheet material may comprise steel, titanium, a titanium alloy, nickel, nickel alloy, cobalt, a cobalt alloy, aluminium or aluminium alloy. The powdered material may comprise a metal. The powdered material may comprise steel, titanium, a titanium alloy, nickel, nickel alloy, cobalt, a cobalt alloy, aluminium or aluminium alloy.

According to a second aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein: the gearbox comprises a planet carrier manufactured according to any of the methods according to the first aspect.

The turbine may be a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

According to a third aspect there is provided a method of manufacturing a support structure for a planet carrier of a gearbox, the method comprising the steps of:
a) manufacturing a preform comprising fused/sintered powdered material by additive layer manufacturing, the preform comprising a base portion, a first end portion located at and connected to a first end of the base portion, a second end portion located at and connected to a second end of the base portion, a first side portion located at and connected to a first side of the base portion, a second side portion located at and connected to a second side of the base portion and a top portion, and
b) folding the first end portion, the second end portion, the first side portion, the second side portion relative to the base portion and folding the top portion and securing the adjacent edges of the first end portion, the second end portion, the first side portion, the second side portion and the top portion together to form a box support structure.

The preform may be a planar preform in which the base portion, the first end portion, the second end portion, the first side portion, the second side portion and the top portion are arranged in a plane The top portion may be connected to the first side portion.

Step a) may comprise forming at least one aperture through the first end portion and forming at least one aperture through the second end portion.

Step a) may comprise manufacturing the preform by additive layer manufacturing to from a preform comprising fused/sintered powdered material. Step a) may comprise manufacturing the preform by powder bed deposition. Step a) may comprise adjusting the additive layer manufacturing process to produce bendable connections between the first end portion and the base portion, the second end portion and the base portion, the first side portion and the base portion and the second side portion and the base portion. Step a) may comprise adjusting the additive layer manufacturing process to produce reduced density of the fused/sintered powder material at the bendable connections, slots in the bendable connections, thinner material at the bendable connections or reduced density of the fused/sintered powder material and thinner material at the bendable connections.

Step a) may comprise additive layer manufacturing interlocking features on the adjacent edges of the first end portion, the second end portion, the first side portion, the second side portion and the top portion of the preform. Step b) may comprise securing the adjacent edges of the first end portion, the second end portion, the first side portion, the second side portion and the top portion of each preform using the interlocking features. The interlocking features may be dovetail projections and dovetail slots. The interlocking features may be tenon projections and mortise slots.

Step a) may comprise forming an aperture through the base portion. Step a) may comprise forming an aperture through the first side portion. Step a) may comprise additive layer manufacturing at least one structure projecting from the base portion and extending across the base portion between the first end portion and the second end portion, the at least one structure having a passage extending therethrough between the first end portion and the second end portion. Step a) may comprise additive layer manufacturing a wall on the first side portion and additive layer manufacturing a wall on the first side portion.

Step a) may comprise manufacturing the preform by cutting the preform from sheet material. Step a) may comprise laser cutting the preform from sheet material. Step b) may comprise bending the sheet material of the preform.

Step a) may comprise cutting interlocking features on the adjacent edges of the first end portion, the second end portion, the first side portion, the second side portion and the top portion of the preform. Step b) may comprise securing the adjacent edges of the first end portion, the second end portion, the first side portion, the second side portion and the top portion of each preform using the interlocking features. The interlocking features may be dovetail projections and dovetail slots.

Step b) may comprises welding, brazing or bonding the adjacent edges of the first end portion, the second end portion, the first side portion, the second side portion and the top portion of each preform together to form the box support structure.

The sheet material may comprise a metal. The sheet material may comprise steel, titanium, a titanium alloy, nickel, nickel alloy, cobalt, a cobalt alloy, aluminium or aluminium alloy. The powdered material may comprise a metal. The powdered material may comprise steel, titanium, a titanium alloy, nickel, nickel alloy, cobalt, a cobalt alloy, aluminium or aluminium alloy.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of –55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE SEVERAL VIEWS OF THE DRAWINGS

Embodiments will now be described by way of example only, with reference to the Figures, in which.

DETAILED DESCRIPTION OF THE DISCLOSURE

Figure 1:
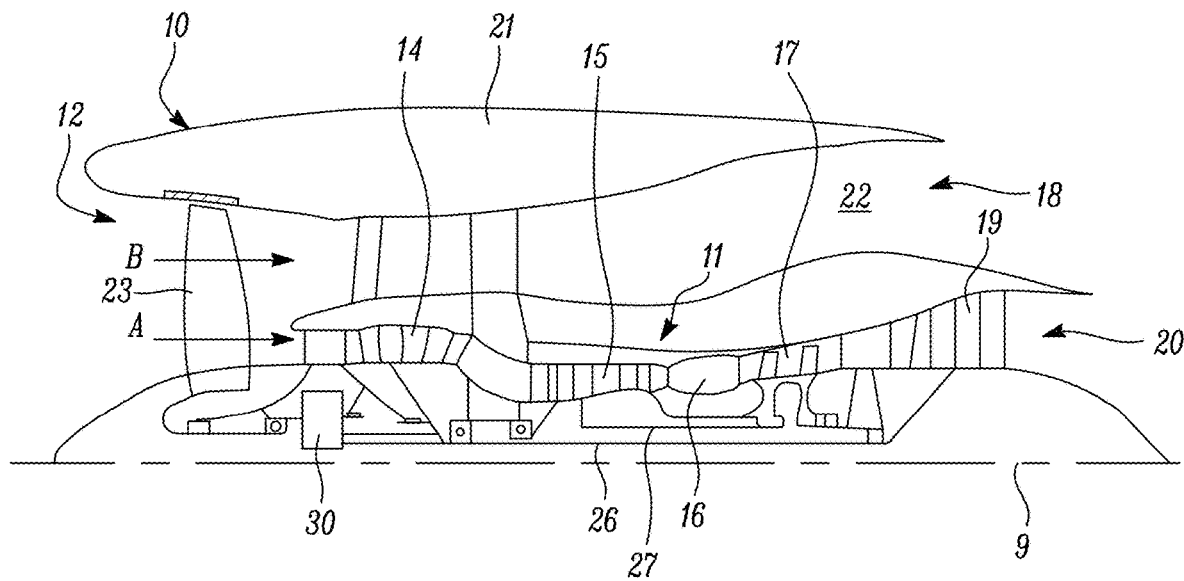
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure turbine 17 and low pressure turbine 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
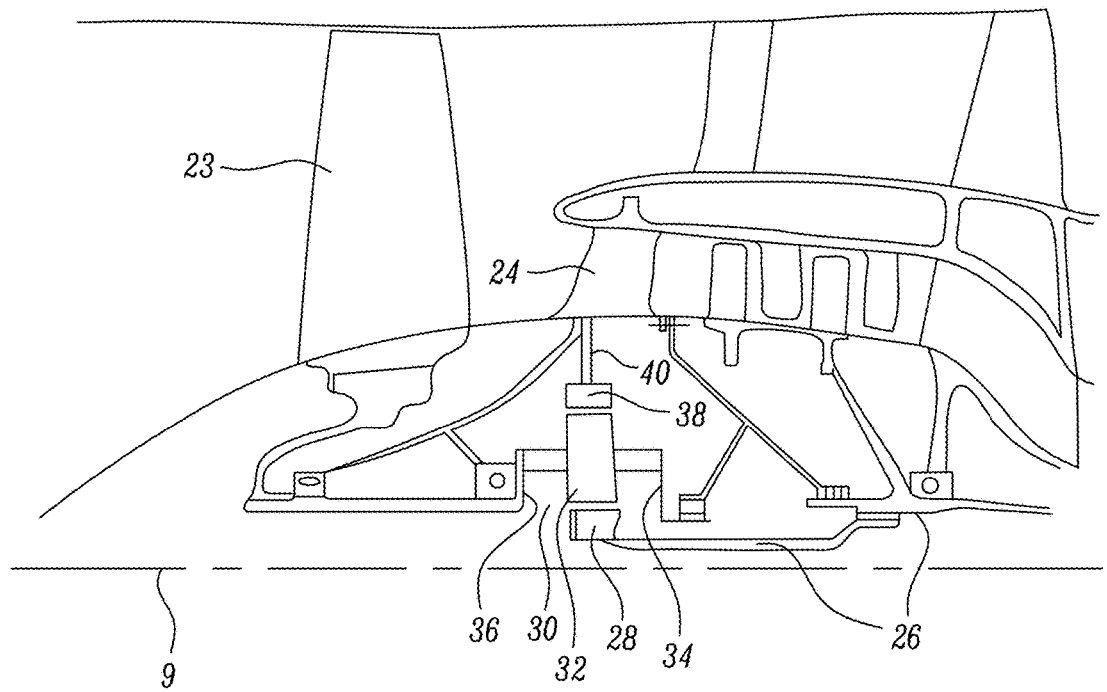
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
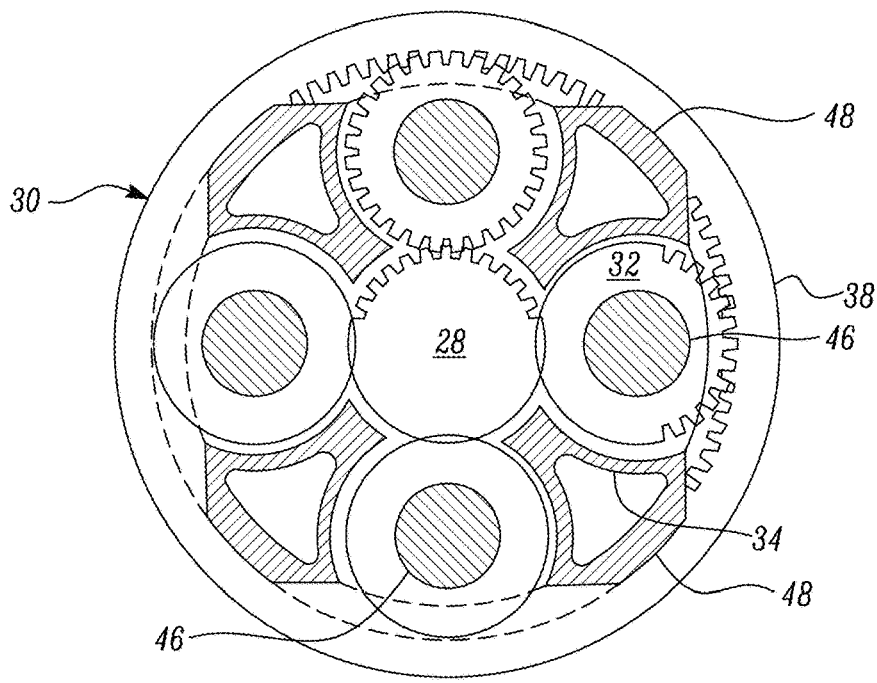
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

As mentioned previously, the gas turbine engine 10 comprises a gearbox 30. The gearbox 30 comprises a sun gear 28, a plurality of planet gears 32, an annulus gear 38 and a planet carrier 34. The sun gear 28 meshes with the planet gears 32 and the planet gears 32 mesh with the annulus gear 38. The planet carrier 34, as shown more clearly in FIGS. 4, 5 and 6 comprises a first ring 42, a second ring 44 spaced axially from the first ring 42, a plurality of circumferentially spaced axles 46 extend axially between the first ring 42 and the second ring 44 and a plurality of circumferentially spaced support structures 48 extend axially between the first ring 42 and the second ring 44. Each planet gear 32 is rotatably mounted on a respective one of the axles 46. Each support structure 48 is arranged circumferentially between two planet gears 32. The first ring 42 has a plurality of circumferentially spaced recesses 50 in a surface 56 facing the second ring 44 and the second ring 44 has a plurality of circumferentially spaced recesses 52 in a surface 58 facing the first ring 42. Each recess 52 in the second ring 44 is aligned circumferentially and radially with a corresponding one of the recesses 50 in the first ring 42. A first axial end 47 of each support structure 48 is located in a respective one of the recesses 50 in the first ring 42, a second axial end 49 of each support structure 48 is located in a respective one of the recesses 52 in the second ring 44, and each support structure 48 is secured to the first ring 42 and the second ring 44. The recesses 50 and 52 have the same shape. The recesses 50 and 52 have the same dimensions. The recesses 50 and 52 extend only part way axially through the first ring 42 and the second ring 44 respectively. Each support structure 48 comprises fused/sintered powdered material. The first ring 42 has a plurality of circumferentially spaced apertures 53, the second ring 44 has a plurality of circumferentially spaced apertures 55 and each aperture 55 in the second ring 44 is aligned circumferentially and radially with a corresponding one of the apertures 53 in the first ring 42. The axial ends of each axle 46 are located in a respective one of the apertures 53 in the first ring 42 and a respective one of the apertures 55 in the second ring 44.

The first ring 42 comprises a metal for example steel, titanium, a titanium alloy, nickel, nickel alloy, cobalt, a cobalt alloy, aluminium or aluminium alloy. The first ring 42 may comprise a forged steel ring or a forged titanium alloy ring. Alternatively, the first ring 42 may comprise a metal matrix composite for example a metal matrix material comprising reinforcing particles in a metal matrix, e.g. an aluminium metal matrix composite. The reinforcing particles may comprise ceramic particles. The reinforcing particles may be a different metal with a greater Young's modulus and a higher melting point. The first ring 42 may comprise a cast aluminium metal matrix composite ring.

The second ring 44 comprises a metal for example steel, titanium, a titanium alloy, nickel, nickel alloy, cobalt, a cobalt alloy, aluminium or aluminium alloy. The second ring 44 may comprise a forged steel ring or a forged titanium alloy ring. Alternatively, the second ring 44 may comprise a metal matrix composite for example a metal matrix material comprising reinforcing particles in a metal matrix, e.g. an aluminium metal matrix composite. The reinforcing particles may comprise ceramic particles. The reinforcing particles may be a different metal with a greater Young's modulus and a higher melting point. The second ring 44 may comprise a cast aluminium metal matrix composite ring. The second ring 44 may comprise the same material as the first ring 42.

Each support structure 48 is secured to the first ring 42 and the second ring 44 by at least one fastener 60 which extends axially through the support structure 48. Each support structure 48 may be secured to the first ring 42 and the second ring 44 by at least one pre-tensioned fastener 60 which extends axially through the support structure 48. Each fastener 60 extends through a respective aperture 51 in the support structure 48 and respective apertures 41 and 45 in the first ring 42 and the second ring 44 respectively. The fasteners 60 may be threaded bolts and each fastener 60 is used with a cooperating nut 62. The first and second axial ends 47 and 49 of each support structure 48 have the same shape as the recesses 50 and 52 in the first and second rings 42 and 44 respectively. The first and second axial ends 47 and 49 of each support member 48 have the same dimensions as the recesses 50 and 52 in the first and second rings 42 and 44 respectively.

Figure 5:
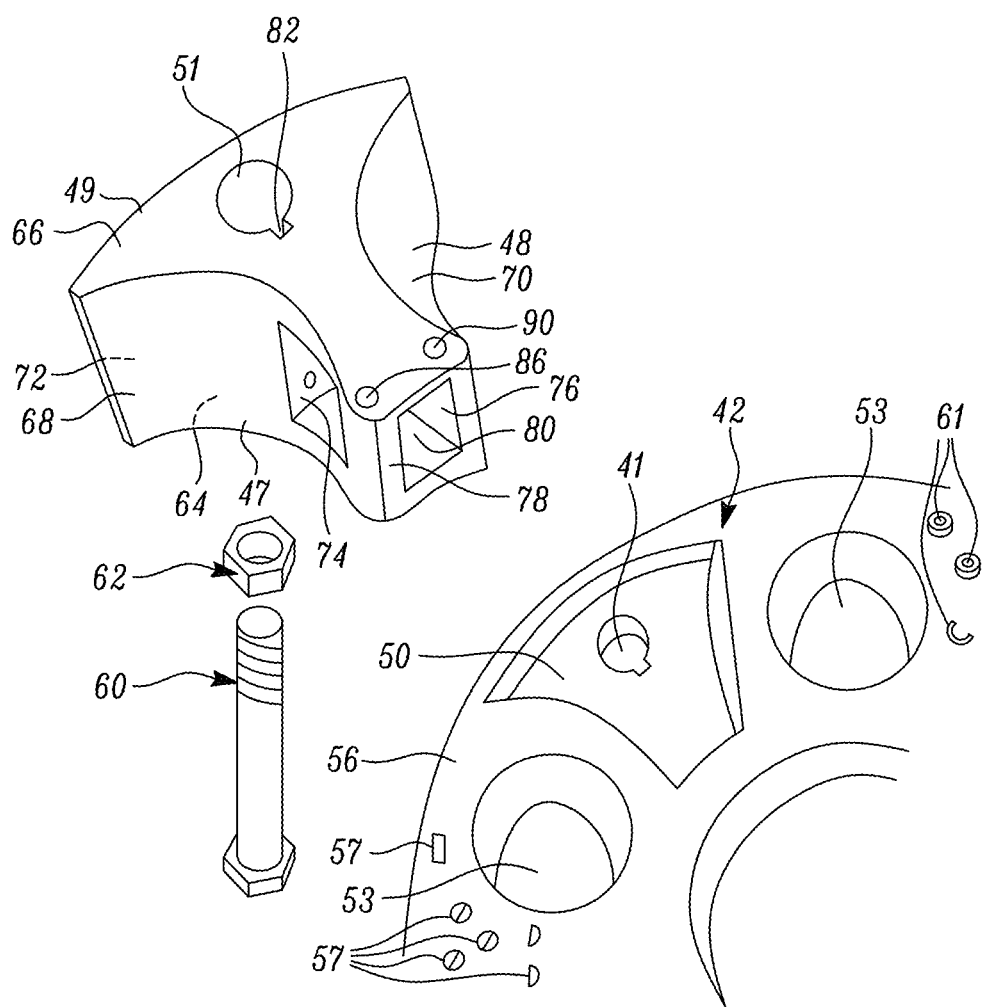
FIG. 5 is a further enlarged exploded perspective view of a portion of the planet carrier of the gearbox shown in FIG. 4.
Figure 6:
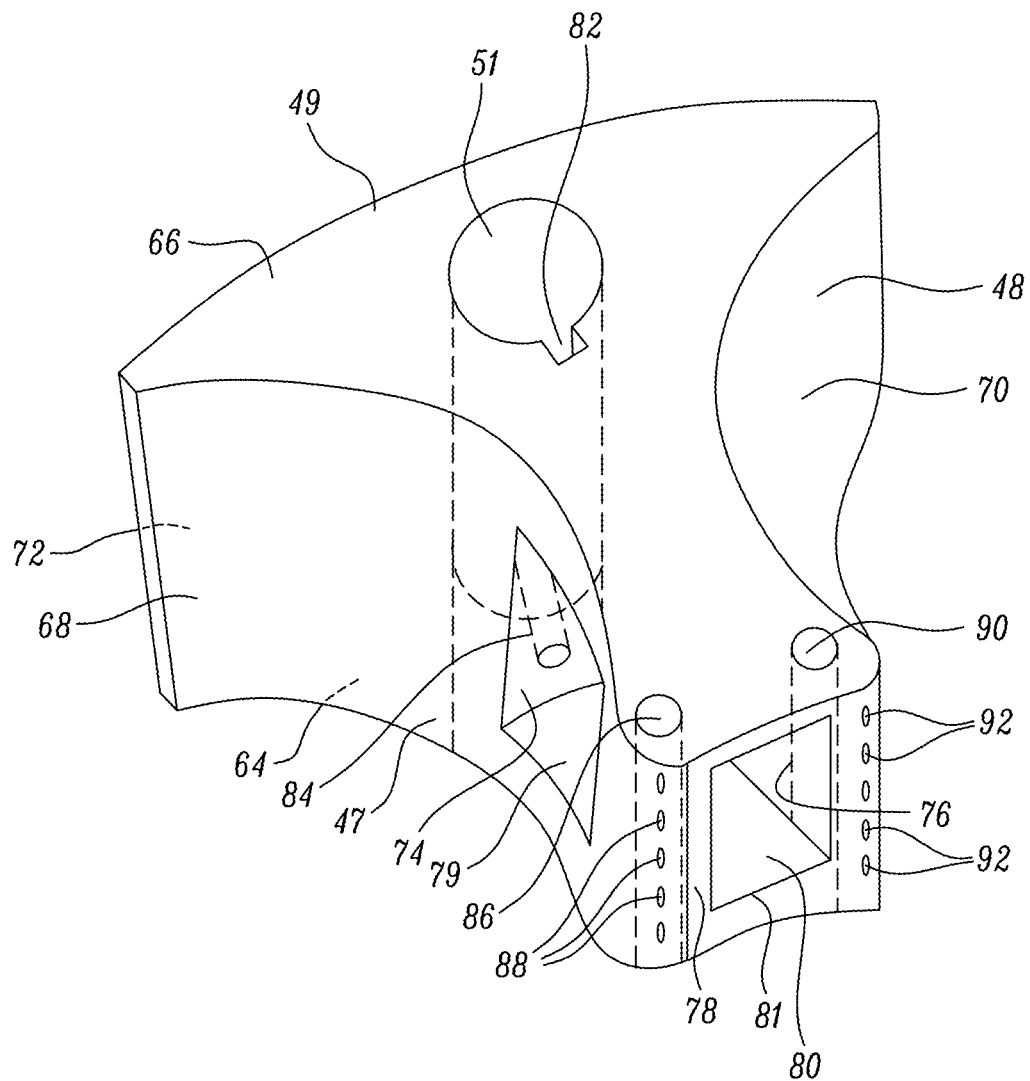
FIG. 6 is a further enlarged perspective view of a support structure for the planet carrier of the gearbox shown in FIG. 5.

Each support structure 48, as shown in FIGS. 5 and 6, is generally wedge shaped in cross-section in a plane perpendicular to the axis of the gearbox 30, e.g. in a plane perpendicular to the axis 9 of the gas turbine engine 10. Each support structure 48 has one or more internal passages for the supply of lubricant to the planet gears 32 and/or the sun gear 28 of the gearbox 30 and one or more internal passages for the collection of lubricant from the planet gears 32 and/or the sun gear 28 of the gearbox 30. Each support structure 48 comprises first and second axially spaced walls 64 and 66, third and fourth circumferentially spaced walls 68 and 70 which interconnect the first and second walls 64 and 66 and fifth and sixth radially spaced walls 72 and 74 which interconnect the first and second walls 64 and 66 and which interconnect the third and fourth walls 68 and 70. The fourth wall 70 is longer than the third wall 68 and extends radially inwardly of the sixth wall 74 to define a lubricant baffle 76. A pillar 78 interconnects the first and second walls 64 and 66. The pillar 78 is spaced radially from a radially inner end of the third wall 68 and the pillar 78 is spaced circumferentially from a radially inner end of the fourth wall 70 to define a lubricant collection chamber 80. Thus, there is a first opening 79 to the lubricant collection chamber 80 between the radially inner end of the third wall 68 and the pillar 78 and a second opening 81 to the lubricant collection chamber 80 between the radially inner end of the third wall 68 and the pillar 78.

Each support structure 48 has a lubricant collection passage 82 extending axially there-through and at least one lubricant scavenge passage 84 extending from the lubricant collection passage to an opening in the sixth wall 74. Each support structure 48 has a plurality of lubricant scavenge passages 84 extending from the lubricant collection passage 82 to respective openings in the sixth wall 74. The lubricant scavenge passages 84 are axially spaced apart. The aperture 51 in the support structure 48 for the fastener 60 may have a keyhole cross-section to define the lubricant collection passage 82. The lubricant collection passage 82 in each support structure 48 is an axially extending groove extending radially from the aperture 51 in the support structure 48. The lubricant collection passage 82 is defined by the axially extending groove extending radially from the aperture 51 and a radially outer surface of the fastener 60. In operation lubricant flung from the rotating planet gears 32 and the sun gear 28 travels through the first and second openings 79 and 81 of each support structure 48 into the lubricant collection chamber 80 and collects on the surface of the sixth wall 74 and the surface of the lubricant baffle 76 and then flows through the, or each, lubricant scavenge passage 84 to the lubricant collection passage 82. The lubricant collection passage 82 of each support structure 48 returns the lubricant to the lubricant system to be supplied to the gearbox 30. Each support structure 48 has a lubricant supply passage 86 extending axially through the pillar 78, and at least one lubricant aperture 88 extending from the lubricant supply passage 86 to a surface of the pillar 78 facing a planet gear 32 of the gearbox 30 and/or a surface of the pillar 78 facing the sun gear 28 of the gearbox 30 and/or a surface pillar 78 facing the region of meshing of a planet gear 32 and the sun gear 28 of the gearbox 30. Each support structure 48 has a plurality of lubricant apertures 88 extending from the lubricant supply passage 86 to the surface of the pillar 78 facing the planet gear 32 of the gearbox 30 and/or the surface of the pillar 78 facing the sun gear 28 of the gearbox 30 and/or a surface pillar 78 facing the region of meshing of a planet gear 32 and the sun gear 28 of the gearbox 30. The lubricant apertures 88 are axially spaced apart.

Each support structure 48 has a lubricant supply passage 90 extending axially through a radially inner end of the fourth wall 70 and at least one lubricant aperture 92 extending from the lubricant supply passage 90 to a surface of the fourth wall 70 facing a planet gear 32 of the gearbox 30 and/or a surface of the fourth wall 70 facing the sun gear 28 of the gearbox 30 and/or a surface of the fourth wall 70 facing the region of meshing of a planet gear 32 and the sun gear 28 of the gearbox 30. Each support structure 48 has a plurality of lubricant apertures 92 extending from the lubricant supply passage 90 to the surface of the fourth wall 70 facing the planet gear 32 of the gearbox 30 and/or the surface of the fourth wall 70 facing the sun gear 28 of the gearbox 30 and/or a surface the fourth wall 70 facing the region of meshing of a planet gear 32 and the sun gear 28 of the gearbox 30. The lubricant apertures 92 are axially spaced apart. In operation lubricant is supplied to the lubricant supply passages 86 and 88 of each support structure 48 and the lubricant is directed as jets of lubricant onto a planet gear 32, the sun gear 28 or the region of meshing of a planet gear 32 and the sun gear 28.

The third and fourth circumferentially spaced wall 68 and 70 respectively of each support structure 48 are arcuate. The third and fourth circumferentially spaced walls 68 and 70 are concave, e.g. the third and fourth walls 68 and 70 curve towards each other. The third and fourth walls 68 and 70 are arcuate, or shaped, to fit circumferentially between the planet gears 32 of the gearbox 30.

The support structures 48 axially space apart the first and second rings 42 and 44 of the planet carrier 34. The support structures 48 connect the first and second rings 42 and 44 of the planet carrier 34. The support structures 48 collect lubricant from the planet gears 32 and/or sun gear 28 of the gearbox 30 and supply lubricant to the planet gears 32 and/or sun gear 28 of the gearbox 30. The support structures 48 form a lubricant baffle to help collect the lubricant. The support structures 48 carry loads and torque between the first and second rings 42 and 44 of the planet carrier 34. The first and second axial ends 47 and 49 of the support structures 48 locate in the recesses 50 and 52 of the first and second rings 42 and 44 respectively to provide improved location of the support structures 48 and additional load and torque carrying capability between the first and second rings 42 and 44 of the planet carrier 34. The pre-tensioned fasteners 60 provide an axial compressive load onto the first and second rings 42 and 44 and the support structures 48.

As mentioned above, the support structures 48 comprise fused, or sintered, powdered material, the support structures 48 may comprise a metal for example steel, titanium, a titanium alloy, nickel, nickel alloy, cobalt, a cobalt alloy, aluminium or aluminium alloy. The support structures 48 may comprise the same material, e.g. the same metal, as the first ring 42 and the second ring 44. The support structures 48 are manufactured by additive layer manufacturing, e.g. laser powder bed, selective laser sintering, direct laser deposition etc. of the powdered material. The support structures 48 may comprise reinforcing material.

Figure 7:
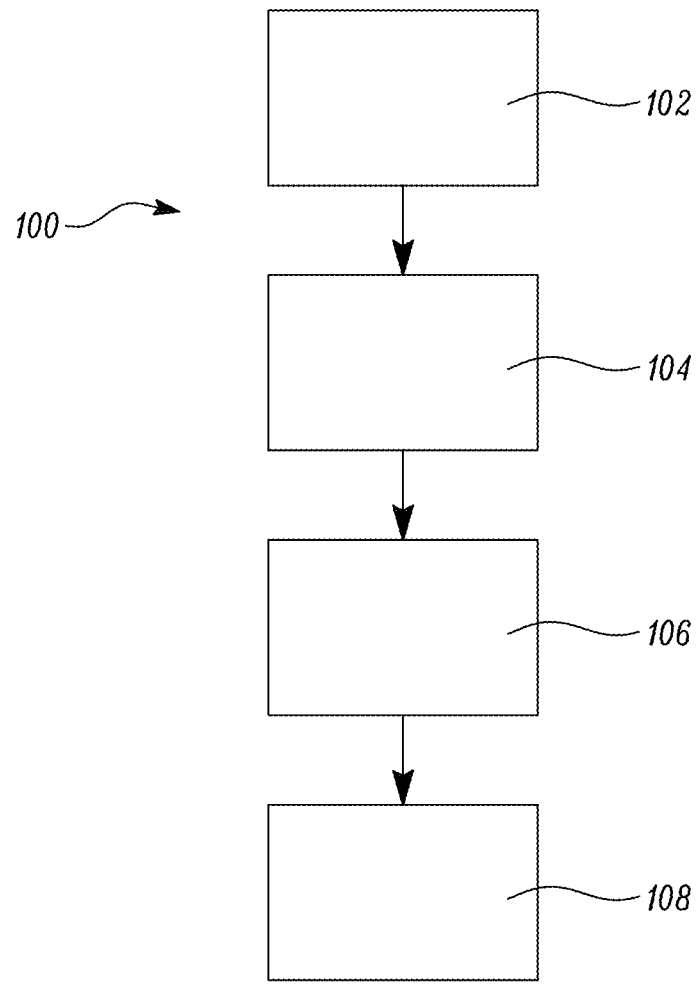
FIG. 7 is a flow chart showing a method of manufacturing a planet carrier for a gearbox according to the present disclosure.
Figure 8:
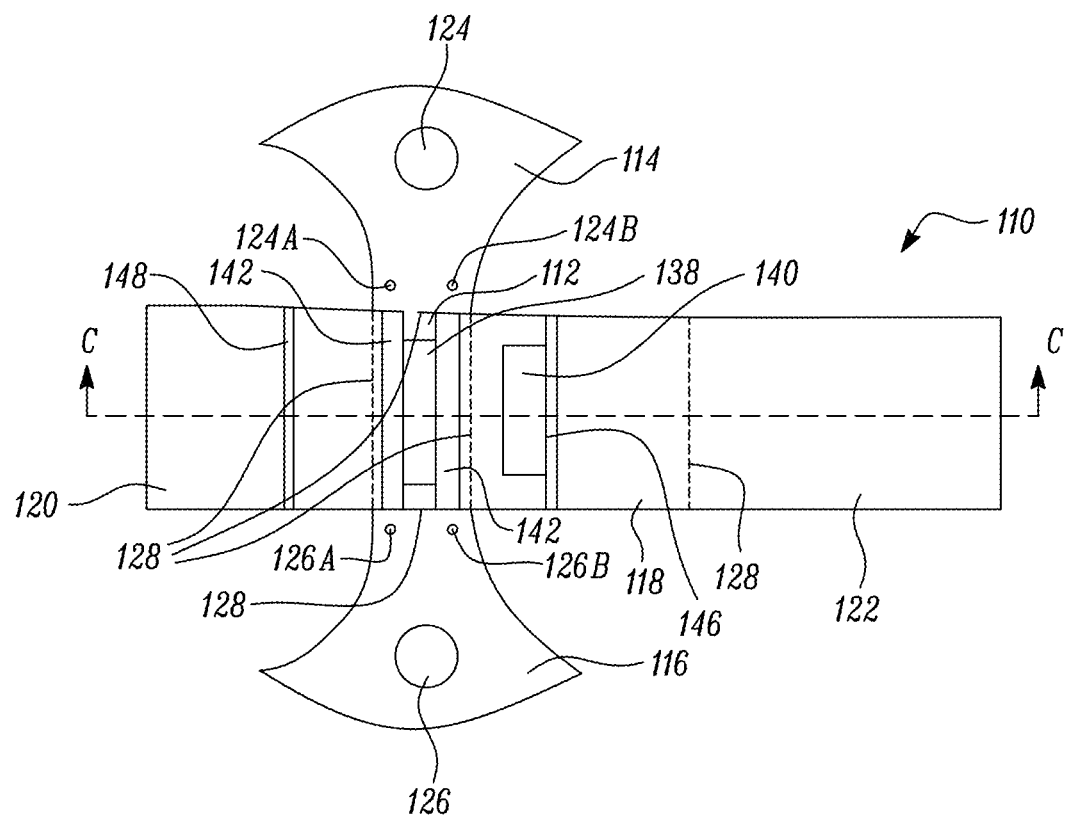
FIG. 8 is a plan view of a preform for manufacturing a support structure for the method of manufacturing a planet carrier of a gearbox according to the present disclosure.
Figure 9:
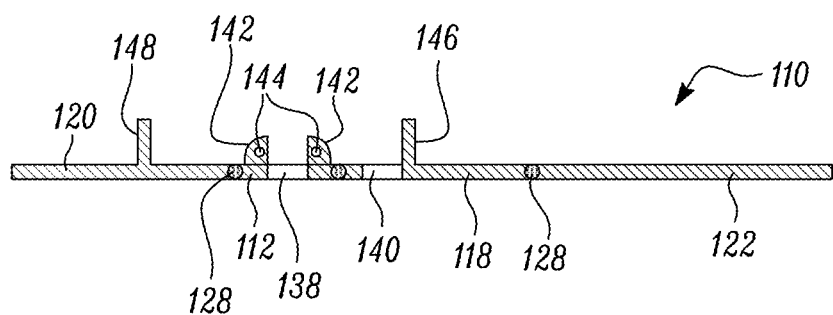
FIG. 9 is a cross-sectional view in the direction of arrow C in FIG. 8.

A method of manufacturing a planet carrier 34 of a gearbox 30 according to the present disclosure is shown in FIG. 7. The method 100 comprises a first step 102 of manufacturing a plurality of preforms 110. Each preform 110, as shown in FIGS. 8 and 9, comprises a base portion 112, a first end portion 114 located at and connected to a first end of the base portion 112, a second end portion 116 located at and connected to a second end of the base portion 112, a first side portion 118 located at and connected to a first side of the base portion 112, a second side portion 120 located at and connected to a second side of the base portion 112 and a top portion 122 located at and connected to the first side portion 118. The method 100 comprises a second step 104 of folding the first end portion 114, the second end portion 116, the first side portion 118, the second side portion 120 relative to the base portion 112 and folding the top portion 122 and then securing the adjacent edges of the first end portion 114, the second end portion 116, the first side portion 118, the second side portion 120 and the top portion 122 of each preform 110 together to form a box support structure 48. The method comprises a third step 106 of manufacturing a first ring 42 and a second ring 44. The method 100 comprises a fourth step of securing the first end portion 114 of each box support structure 48 to the first ring 42 and securing the second end portion 116 of each box support structure 48 to the second ring 44. The folding may be by elastic folding, plastic folding or destructive folding.

The preform 110 is substantially a planar preform in which the base portion 112, the first end portion 114, the second end portion 116, the first side portion 118, the second side portion 120 and the top portion 122 are arranged in a plane. The top portion 122 is connected to the first side portion 118.

Figure 10:
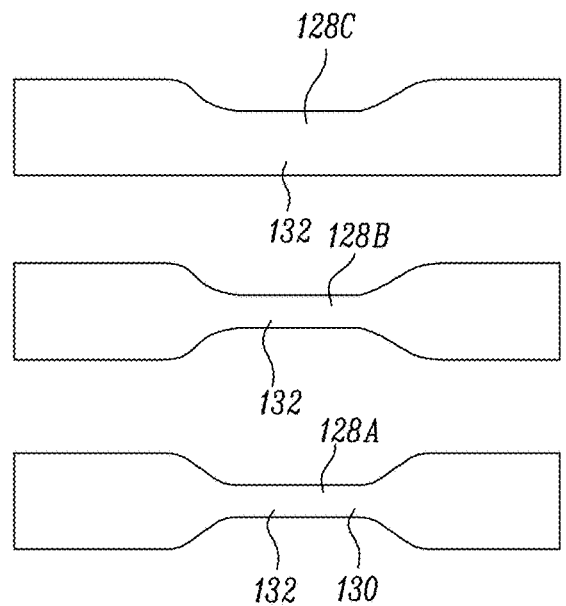
FIG. 10 shows several enlarged cross-sectional views through a connection between portions of a preform shown in FIG. 9

The first step 102 comprises manufacturing the preforms 110 by additive layer manufacturing to from a plurality of preforms 110 comprising fused/sintered powdered material. The first step 102 may comprise manufacturing each of the preforms 110 by powder bed deposition. The first step 102 may comprise manufacturing all of the preforms 110 by powder bed deposition, including manufacturing the preforms 110 sequentially one above the other in the powder bed deposition apparatus. The first step 102 comprises forming at least one aperture 124 through the first end portion 114 and forming at least one aperture 126 through the second end portion 116 to form the apertures 51. The first step 102 comprises adjusting the additive layer manufacturing process to produce bendable connections 128 between the first end portion 114 and the base portion 112, the second end portion 116 and the base portion 112, the first side portion 118 and the base portion 112 and the second side portion 120 and the base portion 112 and the top portion 122 and the first side portion 118. The first step 102 may comprise adjusting the additive layer manufacturing process to produce reduced density 130 of the fused/sintered powder material at the bendable connections 128A, slots in the bendable connections, thinner material 132 at the bendable connections 128A, 128B and 128C or reduced density 130 of the fused/sintered powder material and thinner material 132 at the bendable connections 128A, as shown in FIG. 10. The reduced density of the fused/sintered powder material is relative to that in the immediately adjacent portions of the preform 110. The thinner material is relative to that in the immediately adjacent portions of the preform 110.

Figure 11:
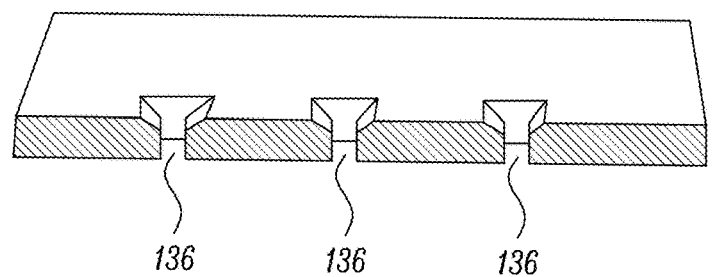
FIG. 11 is an enlarged perspective view of an edge of a portion of a preform shown in FIG. 8.
Figure 12:
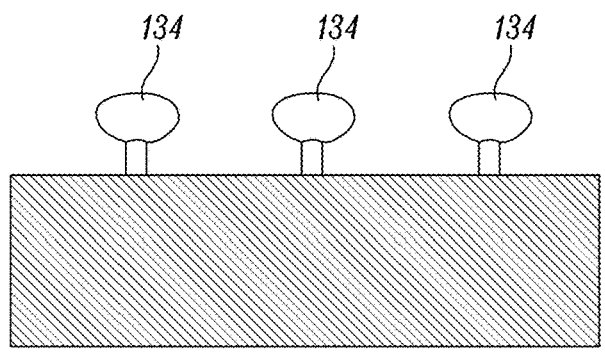
FIG. 12 is an enlarged perspective view of an edge of a portion of a preform shown in FIG. 8.

The first step 102 comprises additive layer manufacturing interlocking features on the adjacent edges of the first end portion 114, the second end portion 116, the first side portion 118, the second side portion 120 and the top portion 122 of each preform 110, as shown in FIGS. 11 and 12. The second step 104 comprises securing the adjacent edges of the first end portion 114, the second end portion 116, the first side portion 118, the second side portion 120 and the top portion 122 of each preform 110 using the interlocking features. In particular the adjacent edges of the first end portion 114 and the first side portion 118, the adjacent edges of the first end portion 114 and the second side portion 120, the adjacent edges of the second end portion 116 and the first side portion 118, the adjacent edges of the second end portion 116 and the second side portion 120, the adjacent edges of the first end portion 114 and the top portion 122, the adjacent edges of the second end portion 114 and the top portion 122 and the adjacent edges of the second side portion 120 and the top portion 122 may be joined using the interlocking features. The interlocking features are dovetail projections 134 and dovetail slots 136. Alternatively, the interlocking features may be tenon projections and mortise slots, hook projections, pin projections or dowel projections and eyeholes or other suitable interlocking features. The projections may be deformable one inserted through the slots, or eyeholes to lock the projections in position.

The first step 102 comprises forming an aperture 138 through the base portion 112 to form the opening 81. The first step 102 comprises forming an aperture 140 through the first side portion 118 to form the opening 79. The first step comprises additive layer manufacturing at least one structure 142 projecting from the base portion 112 and extending across the base portion 112 between the first end portion 114 and the second end portion 116, the at least one structure 142 has a passage 144 extending there-through between the first end portion 114 and the second end portion 116. In this example there are two structures 142 extending across the base portion 112 between the first end portion 114 and the second end portion 116 and both of the structures 142 have a passage 144 extending there-through between the first end portion 114 and the second end portion 116 to form the passages 86 and 90. The aperture 138 is located between the structures 142. The first step 102 comprises additive layer manufacturing a wall 146 on the first side portion 118 and additive layer manufacturing a wall 148 on the second side portion 120 to define the lubricant collection chamber 80. The first step 102 also comprises forming apertures 124A and 124B in the first end portion 114 and 116 and forming apertures 126A and 126B in the second end portion 116 during the additive layer manufacturing process such that they align with the passage 142 when the preform 110 is folded to form the box support structure 48.

The fourth step 108 comprises securing the first end portion 114 of each box support structure 48 to the first ring 42 using the fasteners 60 and 62 and securing the second end portion 116 of each box support structure 48 to the second ring 44 using the fasteners 60 and 62 by passing the fasteners though the apertures 124 and 126 and hence the apertures 51. The second step 104 comprises sealing the wall 146 to the wall 148 for example by welding, brazing or bonding. In one example the third step 106 comprises forming a plurality of circumferentially spaced recesses 50 in the first ring 42 and a plurality of circumferentially spaced recesses 52 in the second ring 44 and the fourth step 108 comprises locating the first end portion 114 of each box support structure 48 in a corresponding one of the plurality of circumferentially spaced recesses in the first ring 42 and locating the second end portion 116 of each box support structure 48 in a corresponding one of the plurality of circumferentially spaced recesses in the second ring 48.

Alternatively the second step 104 may comprise using the interlocking features and welding, brazing or bonding the adjacent edges of the first end portion 114, the second end portion 116, the first side portion 118, the second side portion 120 and the top portion 122 of each preform 110 together to form the box support structure 48. Alternatively the second step 104 may comprise welding, brazing or bonding the adjacent edges of the first end portion 114, the second end portion 116, the first side portion 118, the second side portion 120 and the top portion 122 of each preform 110 together to form the box support structure 48. Alternatively, the fourth step 108 may comprise welding, brazing or bonding the first end portion 114 of each box support structure 48 to the first ring 42 and welding, brazing or bonding the second end portion 116 of each box support structure 48 to the second ring 44.

Referring again to FIG. 4, it is noted that a first shaft 96 extends coaxially from the first ring 42. The first shaft 96 comprises the same material as the first ring 42. A composite material is arranged around and abutting the first shaft 96. The composite material comprises a plurality of continuous reinforcing fibres extending circumferentially around the first shaft 96. The composite material may comprise carbon fibres, a carbon fibre weave or a Kevlar® fibre weave in a resin matrix.

Alternatively, the first shaft 96 may comprise a metal matrix composite. The metal matrix may be steel, titanium, a titanium alloy, nickel, nickel alloy, cobalt, a cobalt alloy, aluminium or aluminium alloy. The reinforcing fibres may be silicon carbide fibres, silicon nitride fibres or boron nitride fibres. The first shaft 96 extends in a downstream direction from the planet carrier 34 and is rotatably mounted in static structure of the gas turbine engine 10 by a bearing. A second shaft 98 extends coaxially from the second ring 44. The second shaft 98 comprises the same material as the second ring 44. A composite material is arranged around and abutting the second shaft 98. The composite material comprises a plurality of continuous reinforcing fibres extending circumferentially around the second shaft 98. The composite material may comprise carbon fibres, a carbon fibre weave or a Kevlar® fibre weave in a resin matrix. Alternatively, the second shaft 98 comprises a metal matrix composite. The metal matrix may be steel, titanium, a titanium alloy, nickel, nickel alloy, cobalt, a cobalt alloy, aluminium or aluminium alloy. The reinforcing fibres may be silicon carbide fibres, silicon nitride fibres or boron nitride fibres. The second shaft 98 extends in an upstream direction from the planet carrier 34 and is rotatably mounted in static structure of the gas turbine engine 10 by a bearing and defines a portion of the linkage 36 to the fan 23.

Each fastener may comprise a metal for example steel, titanium, titanium alloy, nickel, nickel alloy, cobalt or cobalt alloy. Each fastener may comprise a metal matrix composite for example steel, titanium, titanium alloy, nickel, nickel alloy, cobalt or cobalt alloy metal matrix composite.

Figure 4:
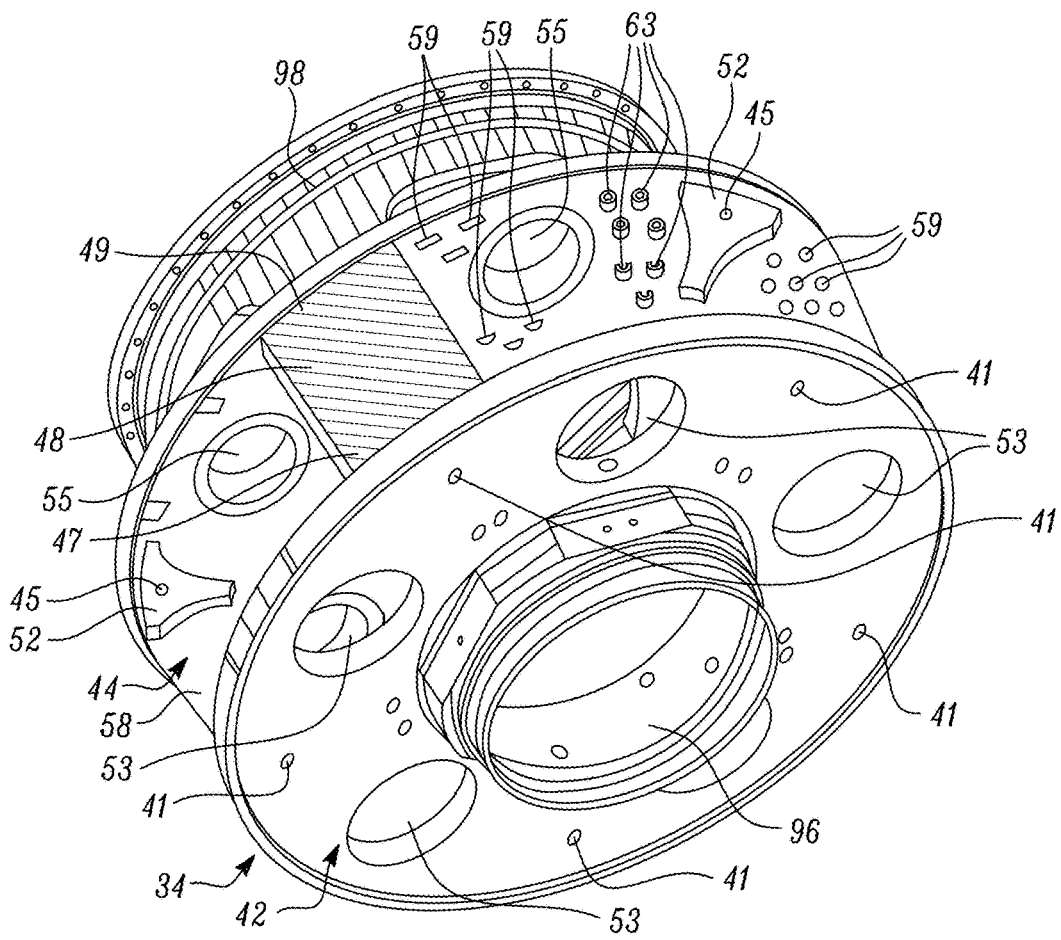
FIG. 4 is an enlarged perspective view of a planet carrier of the gearbox shown in FIG. 3.

The first ring 42 may have a plurality of indentations, or dimples, 57 in the surface 56 facing the second ring 44 and/or the second ring 44 may have a plurality of indentations, or dimples, 59 in the surface 58 facing the first ring 42, as shown in FIGS. 4 and 5. The indentations 57 and 59 may be circular in cross-section. The indentations 57 and 59 may have a constant radius throughout their depth. The indentations 57 and 59 may have an increasing radius with increasing depth. The indentations may have other shapes, e.g. arcuate, half circular or rectangular etc. The arcuate and half circular indentations 57 and 59 may have their concave surface facing away from the axis of the first ring 42 and/or the second ring 44. The first ring 42 may have a plurality of projections 61 extending from the surface 56 facing the second ring 44 and/or the second ring 44 may have a plurality of projections 63 extending away from the surface 58 facing the first ring 42, as shown in FIGS. 4 and 5. The first ring 42 may have a plurality of cup shape projections 61 extending from the surface 56 facing the second ring 44 and/or the second ring 44 may have a plurality of cup shape projections 63 extending away from the surface 58 facing the first ring 42. The projections 61 and 63 may be circular in cross-section. The projections 61 and 63 may have a constant internal radius throughout their depth. The projections 61 and 63 may have an increasing internal radius with increasing depth. The first ring 42 may have a plurality of arcuate projections 61 extending from the surface 56 facing the second ring 44 and/or the second ring 44 may have a plurality of arcuate projections 63 extending away from the surface 58 facing the first ring 42. The arcuate projections 61 and 63 may have a concave surface facing away from the axis of the first ring 42 and/or the second ring 44. The indentations 57 and 59 and/or the projections 61 and 63 are arranged to retain a predetermined, measured, amount of lubricant when the gas turbine engine 10 and the gearbox 30 is not in use. The lubricant retained in the indentations 57 and 59 and/or the projections 61 and 63 provide lubricant during dry starting of the gearbox 30 and ground wind-milling of the gas turbine engine 10 by supplying the lubricant retained in the indentations 57 and 59 and/or the projections 61 and 63 to the sun gear 28, the planet gears 32 and the annulus gear 38 due to the lubricant being centrifuged out of/off the indentations 57 and 59 and/or the projections 61 and 63 during start-up of the gearbox 30 and ground wind-milling of the gas turbine engine 10. The predetermined amount is the minimum amount of lubricant required during dry starting or wind-milling. The indentations 57 and 59 and/or the projections 61 and 63 are arranged so as to not retain too much lubricant when the gas turbine engine 10 and gearbox 30 is not in use. The indentations 57 and 59 and/or the projections 61 and 63 may also be positioned radially and/or circumferentially so as to balance the first ring 42 and/or the second ring 44 and/or the planet carrier 34 as a whole unit.

Figure 13:
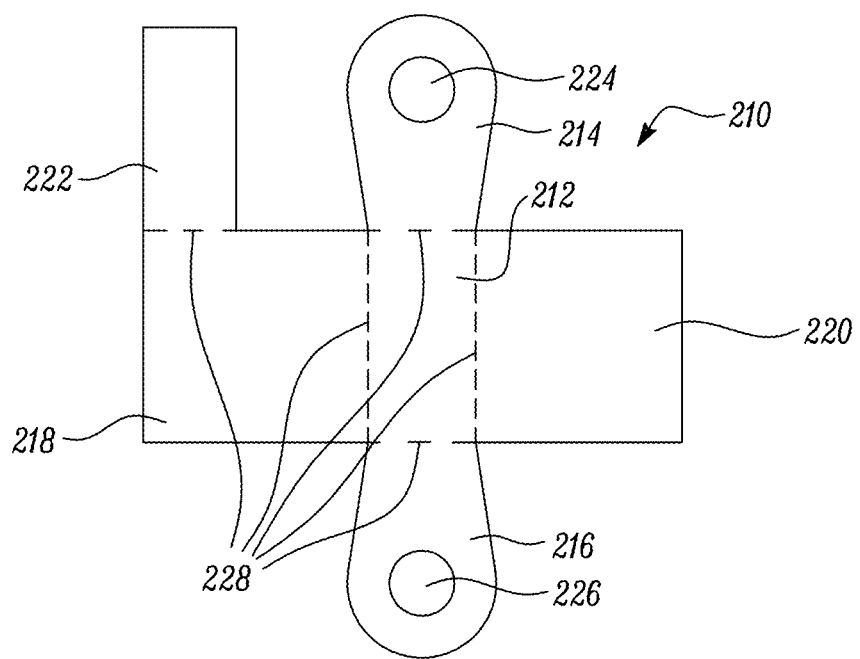
FIG. 13 is a plan view of a preform for manufacturing an alternative support structure for the method of manufacturing a planet carrier of a gearbox according to the present disclosure.

Another method of manufacturing a planet carrier 34 of a gearbox 30 according to the present disclosure comprises manufacturing a plurality of preforms 210. Each preform 210, as shown in FIG. 13, comprises a base portion 212, a first end portion 214 located at and connected to a first end of the base portion 212, a second end portion 216 located at and connected to a second end of the base portion 212, a first side portion 218 located at and connected to a first side of the base portion 212, a second side portion 220 located at and connected to a second side of the base portion 212 and a top portion 222 located at and connected to the first side portion 218. The method 100 comprises a second step 104 of folding the first end portion 214, the second end portion 216, the first side portion 218, the second side portion 220 relative to the base portion 212 and folding the top portion 222 and then securing the adjacent edges of the first end portion 214, the second end portion 216, the first side portion 218, the second side portion 220 and the top portion 222 of each preform 210 together to form a box support structure 48. The method comprises a third step 106 of manufacturing a first ring 42 and a second ring 44. The method 100 comprises a fourth step of securing the first end portion 214 of each box support structure 48 to the first ring 42 and securing the second end portion 216 of each box support structure 48 to the second ring 44.

The preforms 210 are simpler than the preforms 110. The preforms 210 may also be manufactured by additive layer manufacturing in the first step 102. The additive layer manufacturing may be used to form interlocking edges on the adjacent edges of the first end portion, the second end portion, the first side portion, the second side portion and the top portion of each preform 210 and the apertures 224 and 226 in the first and second end portion 214 and 216 respectively in the first step. The first step 102 may comprise adjusting the additive layer manufacturing process to produce bendable connections 228 between the first end portion 214 and the base portion 212, the second end portion 216 and the base portion 212, the first side portion 218 and the base portion 212 and the second side portion 220 and the base portion 212 and the top portion 222 and the first side portion 218. Alternatively, the first step 102 comprises manufacturing the preforms 210 by cutting the preforms 210 from sheet material. The first step 102 may comprise laser cutting the preforms 210 from sheet material. The second step 104 comprises bending the sheet material of each of the preforms 210. The first step 102 comprises cutting interlocking features on the adjacent edges of the first end portion, the second end portion, the first side portion, the second side portion and the top portion of each preform 210. The first step 102 comprises cutting the apertures 224 and 226 in the first and second end portions 214 and 216. The sheet material may comprise a metal for example steel, titanium, a titanium alloy, nickel, nickel alloy, cobalt, a cobalt alloy, aluminium or aluminium alloy. The powdered material may comprise a metal for example steel, titanium, a titanium alloy, nickel, nickel alloy, cobalt, a cobalt alloy, aluminium or aluminium alloy.

The second step 104 comprises securing the adjacent edges of the first end portion, the second end portion, the first side portion, the second side portion and the top portion of each preform using the interlocking features. The interlocking features are dovetail projections and dovetail slots. Alternatively, the interlocking features may be tenon projections and mortise slots or other suitable interlocking features. Alternatively, the second step 104 may comprises welding, brazing or bonding the adjacent edges of the first end portion, the second end portion, the first side portion, the second side portion and the top portion of each preform together to form the box support structure 48. The method comprises a third step 106 of manufacturing a first ring 42 and a second ring 44. The fourth step 108 comprises fastening each box support structure 48 to the first ring 42 and to the second ring 44. The fourth step 108 comprises fastening each box support structure 48 to the first ring 42 and the second ring 44 using at least one bolt and at least one nut 60 and 62. Alternatively, the fourth step 108 comprises welding, brazing or bonding the first end portion of each box support structure 48 to the first ring 42 and welding, brazing or bonding the second end portion of each box support structure 48 to the second ring 44. Alternatively, the fourth step 108 comprises using at least one bolt and at least one nut 60 and 62 and welding, brazing or bonding the first end portion of each box support structure 48 to the first ring 42 and using at least one bolt and at least one nut 60 and 62 and welding, brazing or bonding the second end portion of each box support structure 48 to the second ring 44.

Figure 14:
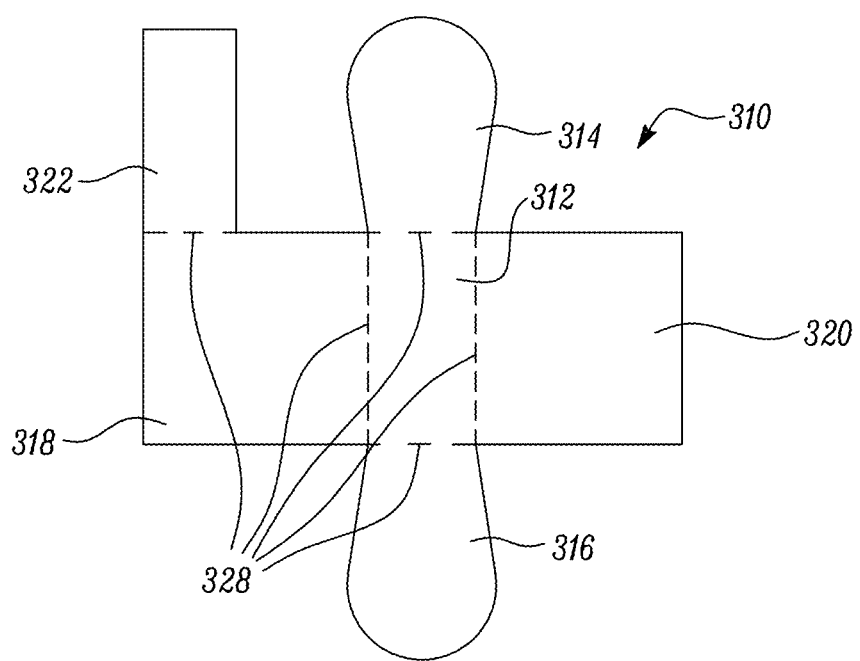
FIG. 14 is a plan view of a preform for manufacturing a further support structure for the method of manufacturing a planet carrier of a gearbox according to the present disclosure.

Another method of manufacturing a planet carrier 34 of a gearbox 30 according to the present disclosure comprises manufacturing a plurality of preforms 310. Each preform 310, as shown in FIG. 14, comprises a base portion 312, a first end portion 314 located at and connected to a first end of the base portion 312, a second end portion 316 located at and connected to a second end of the base portion 312, a first side portion 318 located at and connected to a first side of the base portion 312, a second side portion 320 located at and connected to a second side of the base portion 312 and a top portion 322 located at and connected to the first side portion 318. The method 100 comprises a second step 104 of folding the first end portion 314, the second end portion 316, the first side portion 318, the second side portion 320 relative to the base portion 312 and folding the top portion 322 and then securing the adjacent edges of the first end portion 314, the second end portion 316, the first side portion 318, the second side portion 320 and the top portion 322 of each preform 310 together to form a box support structure 48. The method comprises a third step 106 of manufacturing a first ring 42 and a second ring 44. The method 100 comprises a fourth step 108 of securing the first end portion 314 of each box support structure 48 to the first ring 42 and securing the second end portion 316 of each box support structure 48 to the second ring 44.

The preforms 310 are simpler than the preforms 110 and 210. The preforms 310 may also be manufactured by additive layer manufacturing in the first step 102. The additive layer manufacturing may be used to form interlocking edges on the adjacent edges of the first end portion, the second end portion, the first side portion, the second side portion and the top portion of each preform 310 in the first step. The first step 102 may comprise adjusting the additive layer manufacturing process to produce bendable connections 328 between the first end portion 314 and the base portion 312, the second end portion 316 and the base portion 312, the first side portion 318 and the base portion 312 and the second side portion 320 and the base portion 312 and the top portion 322 and the first side portion 318. Alternatively, the first step 102 comprises manufacturing the preforms 310 by cutting the preforms 310 from sheet material. The first step 102 may comprise laser cutting the preforms 310 from sheet material. The second step 104 comprises bending the sheet material of each of the preforms 310. The first step 102 comprises cutting interlocking features on the adjacent edges of the first end portion, the second end portion, the first side portion, the second side portion and the top portion of each preform 310. The fourth step 108 simply comprises welding, brazing or bonding the first end portion of each box support structure 48 to the first ring 42 and welding, brazing or bonding the second end portion of each box support structure 48 to the second ring 44. The sheet material may comprise a metal for example steel, titanium, a titanium alloy, nickel, nickel alloy, cobalt, a cobalt alloy, aluminium or aluminium alloy. The powdered material may comprise a metal for example steel, titanium, a titanium alloy, nickel, nickel alloy, cobalt, a cobalt alloy, aluminium or aluminium alloy.

Figure 15:
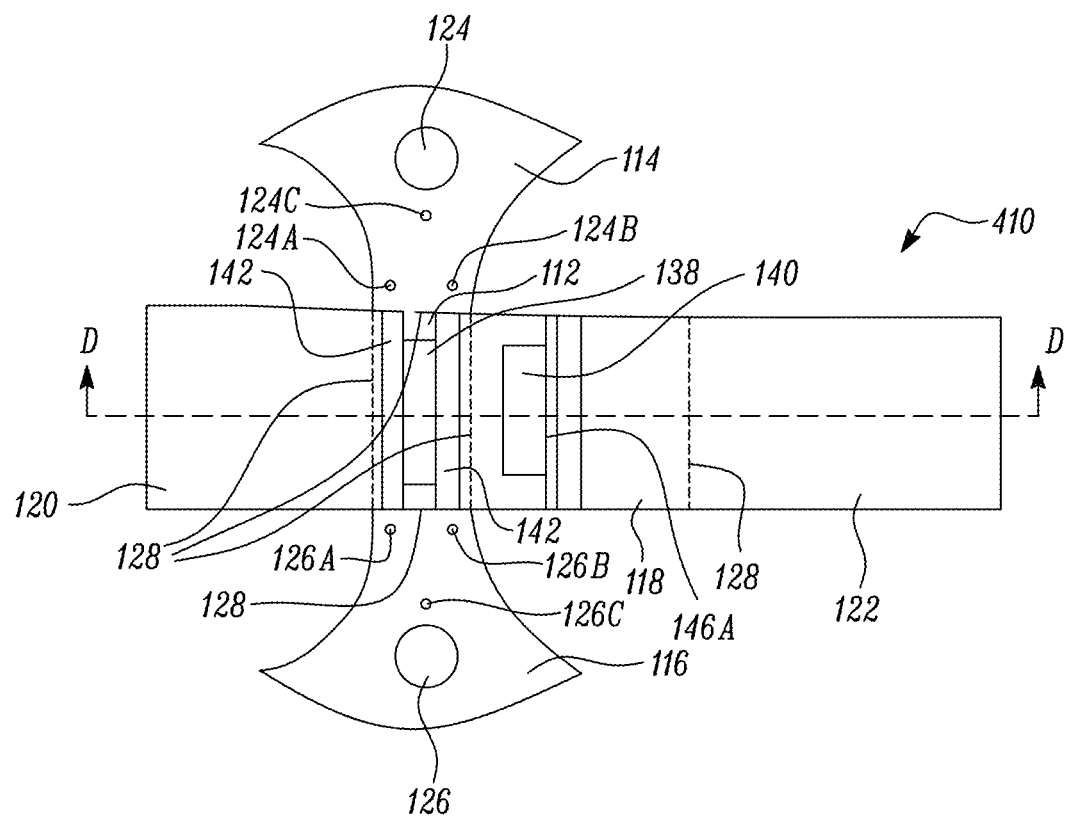
FIG. 15 is a plan view of a preform for manufacturing a support structure for the method of manufacturing a planet carrier of a gearbox according to the present disclosure.
Figure 16:
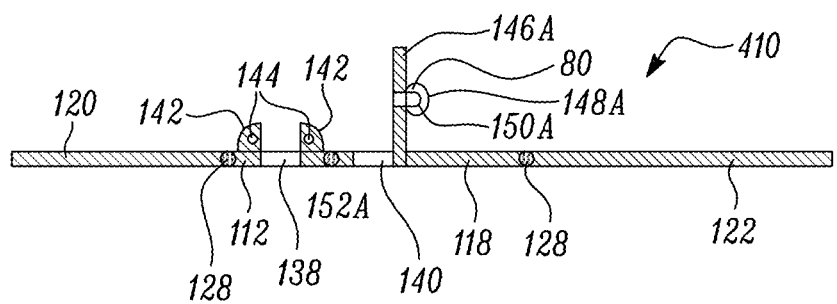
FIG. 16 is a cross-sectional view in the direction of arrow D in FIG. 15.

An additional method of manufacturing a planet carrier 34 of a gearbox 30 according to the present disclosure comprises manufacturing a plurality of preforms 410, as shown in FIGS. 15 and 16. Each preform 410 is similar to the preform 110 shown in FIGS. 8 and 9 and like parts are denoted by like numerals. The method comprises additive layer manufacturing a wall 146A on the first side portion 118 to define the lubricant collection chamber 80. The wall 146A is long enough to extend completely across the width of the first side portion 118 and hence folded box support structure 48. The method also comprises additive layer manufacturing a structure 148A on the wall 146A which is also long enough to extend completely across the first side portions 118 and hence folded box support structure 48. The structure 148A has a passage 150A extending completely across the first side portion 118. The first and second end portions 114 and 116 have apertures 124C and 126C respectively formed during the additive layer manufacturing process such that they align with the passage 152A when the preform 410 is folded to form the box support structure 48.

In the case of the planar preforms manufactured by additive layer manufacturing the planar preforms may be manufactured horizontally, e.g. parallel to the manufacturing base plate. Alternatively the planar preforms may be manufactured at an inclination angle to the horizontal direction, e.g. at an inclination angle to the manufacturing base plate so as to reduce the number supporting members to be built and removed during the manufacturing of the preforms.

Although the description has referred to the use of preforms in which each of the portions of the preforms comprise a planar structure it is equally possible that one or more or all of the portions of the preform comprises a framework. The additive layer manufacturing process may be used to produce the preforms comprising one or more or all of the portions comprising a framework. Alternatively, laser cutting may be used to produce the preforms comprising one or more or all of the portions comprising a framework.

Although the present disclosure has referred to the recesses extending only part way axially through first ring and the second ring it may be possible for the recesses to extend axially all the way through the first ring and the second ring. In such circumstances the support structures may be secured to the first and second rings by bonding, welding, brazing etc.

The manufacturing of the preforms is a cost effective way of making the support structures for the planet carrier. The additive layer manufacturing of the preforms is a cost effective way of making the support structures for the planet carrier because it is possible to build all the support structures together in the same powder bed laser deposition apparatus by building them sequentially one above the other in the powder bed deposition apparatus.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of manufacturing a planet carrier of a gearbox, the method comprising the steps of:
   a) manufacturing a plurality of preforms, each preform comprising a base portion, a first end portion located at and connected to a first end of the base portion, a second end portion located at and connected to a second end of the base portion, a first side portion located at and connected to a first side of the base portion, a second side portion located at and connected to a second side of the base portion and a top portion,
   b) folding the first end portion, the second end portion, the first side portion, the second side portion relative to the base portion and folding the top portion and securing the adjacent edges of the first end portion, the second end portion, the first side portion, the second side portion and the top portion of each preform together to form a box support structure,
   c) manufacturing a first ring and a second ring, and
   d) for each box support structure, securing the first end portion to the first ring and securing the second end portion to the second ring,
   wherein the box support structure is a separate piece of structure from the first ring and the second ring.

2. The method as claimed in claim 1, wherein each preform is a planar preform in which the base portion, the first end portion, the second end portion, the first side portion, the second side portion and the top portion are arranged in a plane.

3. The method as claimed in claim 1, wherein the top portion is connected to the first side portion.

4. The method as claimed in claim 1, wherein step a) comprises forming at least one aperture through the first end portion and forming at least one aperture through the second end portion.

5. The method as claimed in claim 1, wherein step a) comprises manufacturing the preforms by additive layer manufacturing to from a plurality of preforms comprising fused/sintered powdered material.

6. The method as claimed in claim 5, wherein step a) comprises adjusting the additive layer manufacturing process to produce bendable connections between the first end portion and the base portion, the second end portion and the base portion, the first side portion and the base portion and the second side portion and the base portion.

7. The method as claimed in claim 6 wherein step a) comprises adjusting the additive layer manufacturing process to produce reduced density of the fused/sintered powder material at the bendable connections, slots in the bendable connections, thinner material at the bendable connections or reduced density of the fused/sintered powder material and thinner material at the bendable connections.

8. The method as claimed in claim 5 wherein step a) comprises additive layer manufacturing interlocking features on the adjacent edges of the first end portion, the second end portion, the first side portion, the second side portion and the top portion of each preform.

9. The method as claimed in claim 8, wherein step b) comprises securing the adjacent edges of the first end portion, the second end portion, the first side portion, the second side portion and the top portion of each preform using the interlocking features.

10. The method as claimed in claim 8, wherein the interlocking features are dovetail projections and dovetail slots or tenon projections and mortise slots.

11. The method as claimed in claim 5, wherein step a) comprises forming an aperture through the base portion.

12. The method as claimed in claim 5, wherein step a) comprises additive layer manufacturing at least one structure projecting from the base portion and extending across the base portion between the first end portion and the second end portion, the at least one structure having a passage extending there-through between the first end portion and the second end portion.

13. The method as claimed in claim 5, wherein step a) comprises additive layer manufacturing a wall on the first side portion and additive layer manufacturing a wall on the first side portion.

14. The method as claimed in claim 1, wherein step a) comprises manufacturing each of the preforms by powder bed deposition.

15. The method as claimed in claim 14, wherein step a) comprises manufacturing all of the preforms by powder bed deposition, including manufacturing the preforms sequentially one above the other in the powder bed deposition apparatus.

16. The method as claimed in claim 1, wherein step a) comprises manufacturing the preforms by cutting the preforms from sheet material.

17. The method as claimed in claim 16, wherein step a) comprises laser cutting the preforms from sheet material.

18. The method as claimed in claim 16, wherein step b) comprises bending the sheet material of each of the preforms.

19. The method as claimed in claim 16, wherein step a) comprise cutting interlocking features on the adjacent edges of the first end portion, the second end portion, the first side portion, the second side portion and the top portion of each preform.

20. The method as claimed in claim 19, wherein step b) comprises securing the adjacent edges of the first end portion, the second end portion, the first side portion, the second side portion and the top portion of each preform using the interlocking features.

* * * * *